(12) United States Patent
Murakami et al.

(10) Patent No.: US 9,902,565 B2
(45) Date of Patent: Feb. 27, 2018

(54) ARTICLE TRANSPORT FACILITY

(71) Applicant: Daifuku Co., Ltd., Osaka-shi (JP)

(72) Inventors: Ryuya Murakami, Moriyama (JP); Junji Shibata, Gamo-gun (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/426,114

(22) Filed: Feb. 7, 2017

(65) Prior Publication Data

US 2017/0225904 A1  Aug. 10, 2017

(30) Foreign Application Priority Data

Feb. 8, 2016 (JP) ................................. 2016-022046

(51) Int. Cl.
*B60L 11/18* (2006.01)
*B08B 5/04* (2006.01)
*B65G 45/10* (2006.01)

(52) U.S. Cl.
CPC ............... *B65G 45/10* (2013.01); *B08B 5/04* (2013.01); *B60L 11/182* (2013.01); *B60L 11/1816* (2013.01)

(58) Field of Classification Search
CPC ...... B65G 45/10; B65G 45/105; B65G 45/12; B65G 45/14; B65G 45/16; B65G 45/18; B65G 45/20; B65G 45/22; B65G 45/24; B65G 45/26; B60L 11/1801; B60L 11/182; B08B 5/04; B08B 5/043; B08B 5/046
See application file for complete search history.

(56) References Cited

U.S. PATENT DOCUMENTS

| 3,641,618 A * | 2/1972 | Rainey ................... E01H 8/105 118/696 |
| 9,687,889 B2 * | 6/2017 | Shibata .................. B65G 45/22 |
| 9,697,640 B2 * | 7/2017 | Obert ...................... G06T 15/06 |
| 2004/0025739 A1 * | 2/2004 | Matsukawa ............. B61B 13/00 104/96 |
| 2012/0312327 A1 | 12/2012 | Morimoto et al. |

FOREIGN PATENT DOCUMENTS

JP             5495070 B2     3/2014

* cited by examiner

*Primary Examiner* — Mark A Deuble
(74) *Attorney, Agent, or Firm* — The Webb Law Firm

(57) ABSTRACT

An article transport facility includes a traveling portion configured to travel on a traveling rail, a cleaning unit coupled to the traveling portion, a feeding portion configured to supply traveling driving power for the traveling portion and cleaning driving power for the cleaning unit, a power storage device connected between the feeding portion and the cleaning unit, and a power control portion. The power control portion is configured to: charge the power storage device with power corresponding to a driving state of the traveling portion and a position of the traveling portion along the transport path; and discharge the power storage device when power received from the feeding portion is insufficient relative to a total power of the traveling driving power and the cleaning driving power.

7 Claims, 9 Drawing Sheets

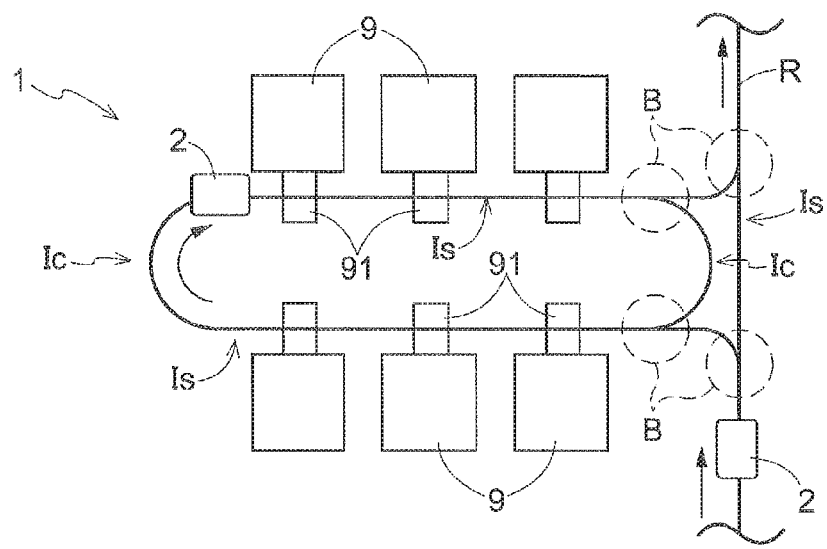
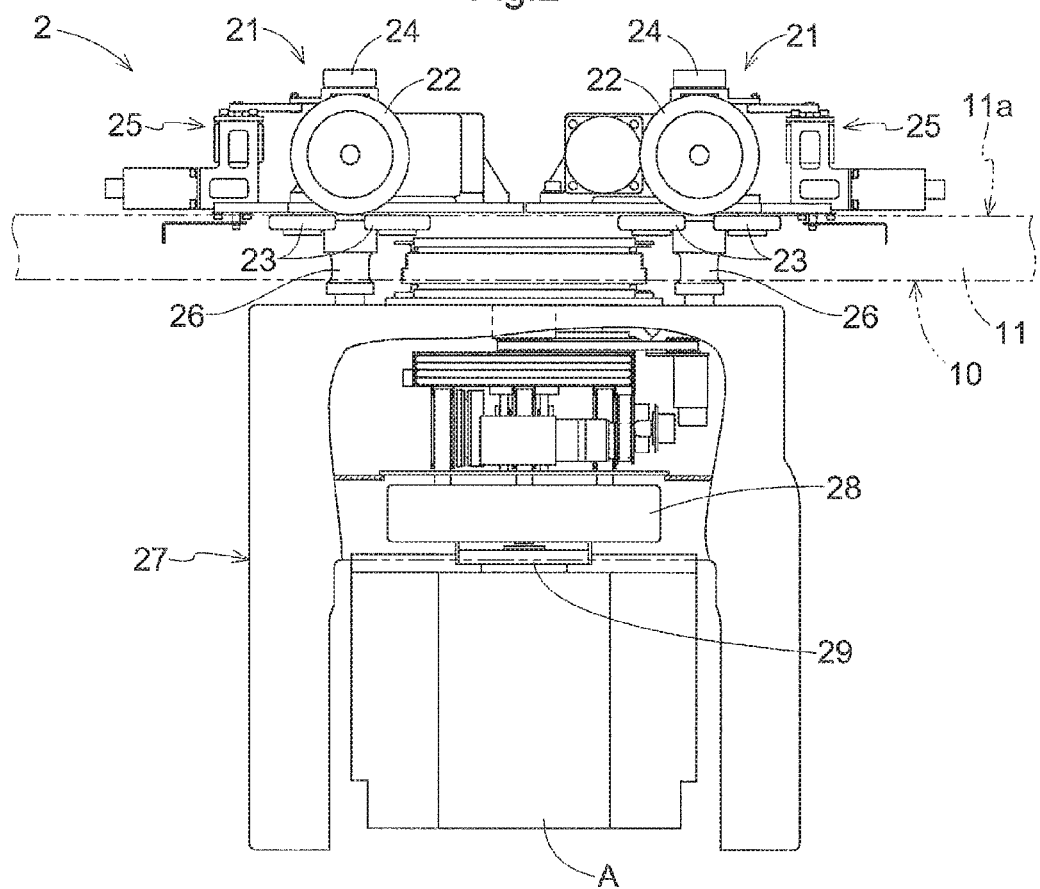

Fig.9
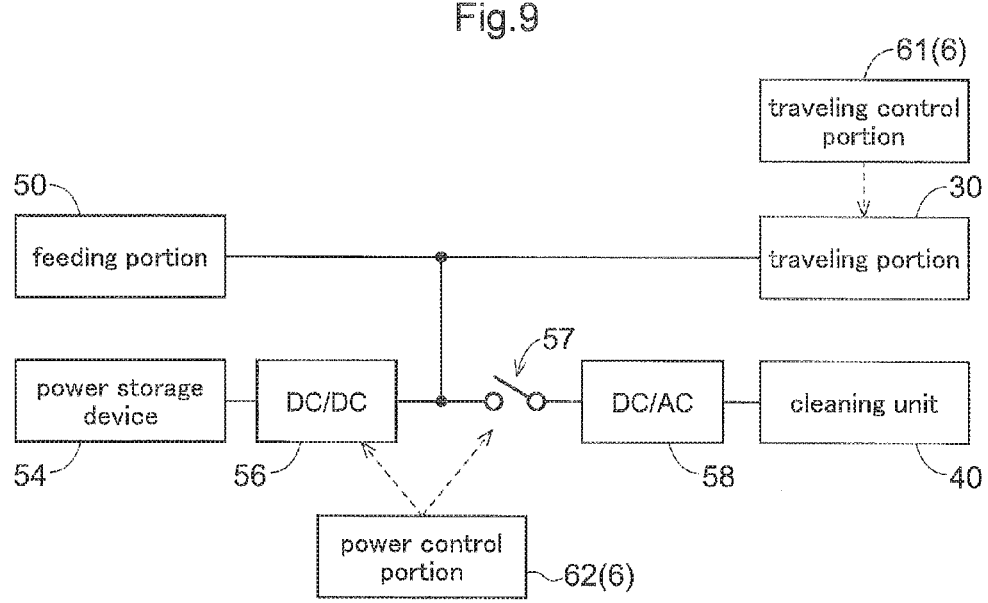
Fig.10
| control mode | traveling position | driving state of traveling portion | driving state of cleaning unit | set charging power |
|---|---|---|---|---|
| MODE 4 | straight segment | | OFF | W3 |
| MODE 1 | | | ON | W2 |
| MODE 3 | curve segment/ branch point | | OFF | |
| MODE 2 | | | ON | W1(=0) |
Fig.11
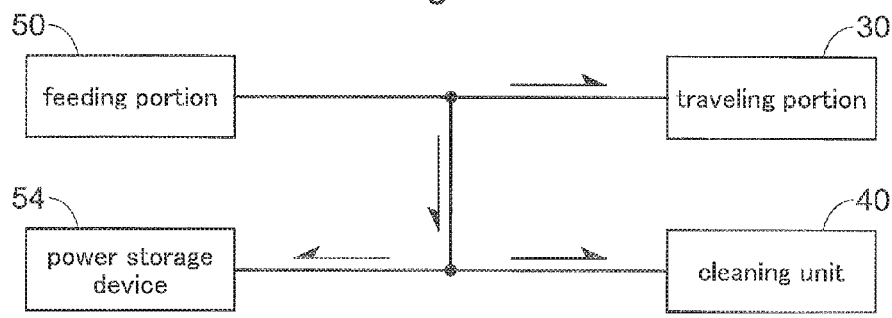

ARTICLE TRANSPORT FACILITY

CROSS-REFERENCE TO RELATED APPLICATION

This application claims priority to Japanese Patent Application No. 2016-022046 filed Feb. 8, 2016, the disclosure of which is hereby incorporated in its entirety by reference.

FIELD OF THE INVENTION

The present invention relates to an article transport facility that transports an article.

BACKGROUND

An article transport facility is used, for example, to transport materials, intermediate products, finished products, and the like in manufacturing facilities and the like of various products. In general, an article transport facility includes an article transport device including a traveling portion that travels on a traveling rail provided along a transport path, and a transfer unit that is coupled to the traveling portion and performs an operation of transferring an article to and from a transport target location. When such an article transport facility is used, for example, in a clean room or the like, the article transport facility may further include, in addition to the article transport device, a cleaning device including a traveling portion and a cleaning unit that is coupled to the traveling portion and performs a cleaning operation on a cleaning target location. An article transport facility having such a cleaning function is disclosed in JP 5495070B (Patent Document 1), for example.

In the article transport facility of Patent Document 1, the driving power to the traveling portion (42F, 42R) of an article transport device (2) and a cleaning device (2A) is supplied from a noncontact-type feeding portion (24, 25) (see paragraphs [0087] and [0109] of Patent Document 1). On the other hand, the driving power to a cleaning unit (G, 41) is supplied from a power storage device installed in the cleaning unit (see paragraph [0113]).

However, when the driving power to the cleaning unit is supplied from the power storage device, the driving state of the cleaning unit is dependent on the charging state of the power storage device. For this reason, there is a limit to the time during which the cleaning operation can be actually performed, and it has been necessary to suspend a cleaning operation, for example, for replacement of the power storage device.

SUMMARY OF THE INVENTION

There is a need to enable a cleaning operation to be performed as constantly as possible in an article transport facility having a cleaning function.

An article transport facility according to the present invention is an article transport facility that transports an article, including:

a traveling portion configured to travel on a traveling rail provided along a transport path;

a cleaning unit coupled to the traveling portion and configured to perform a cleaning operation on a cleaning target location including the traveling rail;

a feeding portion provided separately on a side of the traveling rail and a side of the traveling portion, and configured to supply traveling driving power to the traveling portion and cleaning driving power to the cleaning unit;

a power storage device electrically connected between the feeding portion and the cleaning unit, and capable of being charged and discharged; and a power control portion configured to: charge the power storage device with power corresponding to a driving state of the traveling portion and a position of the traveling portion along the transport path; and discharge the power storage device to supply power to the cleaning unit when power received from the feeding portion is insufficient relative to a total power of the traveling driving power and the cleaning driving power.

With this configuration, it is possible to automatically perform a cleaning operation on the cleaning target location including the traveling rail, while driving the traveling portion and the cleaning unit with the power supplied from the feeding portion, and moving the cleaning unit along the transport path. Since the driving power for the cleaning unit is mainly supplied from the feeding portion, it is possible to perform the cleaning operation without any constraint on the possible duration, unlike in a case where the driving power is supplied only from the power storage device.

On the other hand, there is a limit to the feeding capacity of the feeding portion. Therefore, when the power from the feeding portion is supplied to both the traveling portion and the cleaning unit, a situation may occur in which the power supplied from the feeding portion is insufficient relative to the total power of the traveling driving power to the traveling portion and the cleaning driving power to the cleaning unit. Even in such a case, the power storage device is discharged, and the power discharged from the power storage device is supplied to the cleaning unit, and it is therefore possible to continue the cleaning operation. Since the power storage device is charged with power corresponding to the driving state and the position of the traveling portion during traveling or stoppage of the traveling portion, a stored power amount greater than or equal to a certain amount can be easily secured in the power storage device. Thus, it is possible to appropriately supply the discharged power to the cleaning unit where the necessity arises.

As described thus far, it is possible to achieve an article transport facility capable of performing a cleaning operation as constantly as possible.

Further features and advantages of the present invention will become apparent from the following description of illustrative and non-limiting embodiments with reference to the drawings.

BRIEF DESCRIPTION OF THE DRAWINGS

FIG. 1 is a schematic diagram showing a transport path in an article transport facility.

FIG. 2 is a side view of an article transport device.

FIG. 9 is a block diagram of a feeding system for the cleaning device.

FIG. 10 is an explanatory diagram showing a relationship between various control modes and set charging powers.

FIG. 11 is a schematic diagram showing a feeding state in a first control mode.

DETAILED DESCRIPTION

Figure 3:
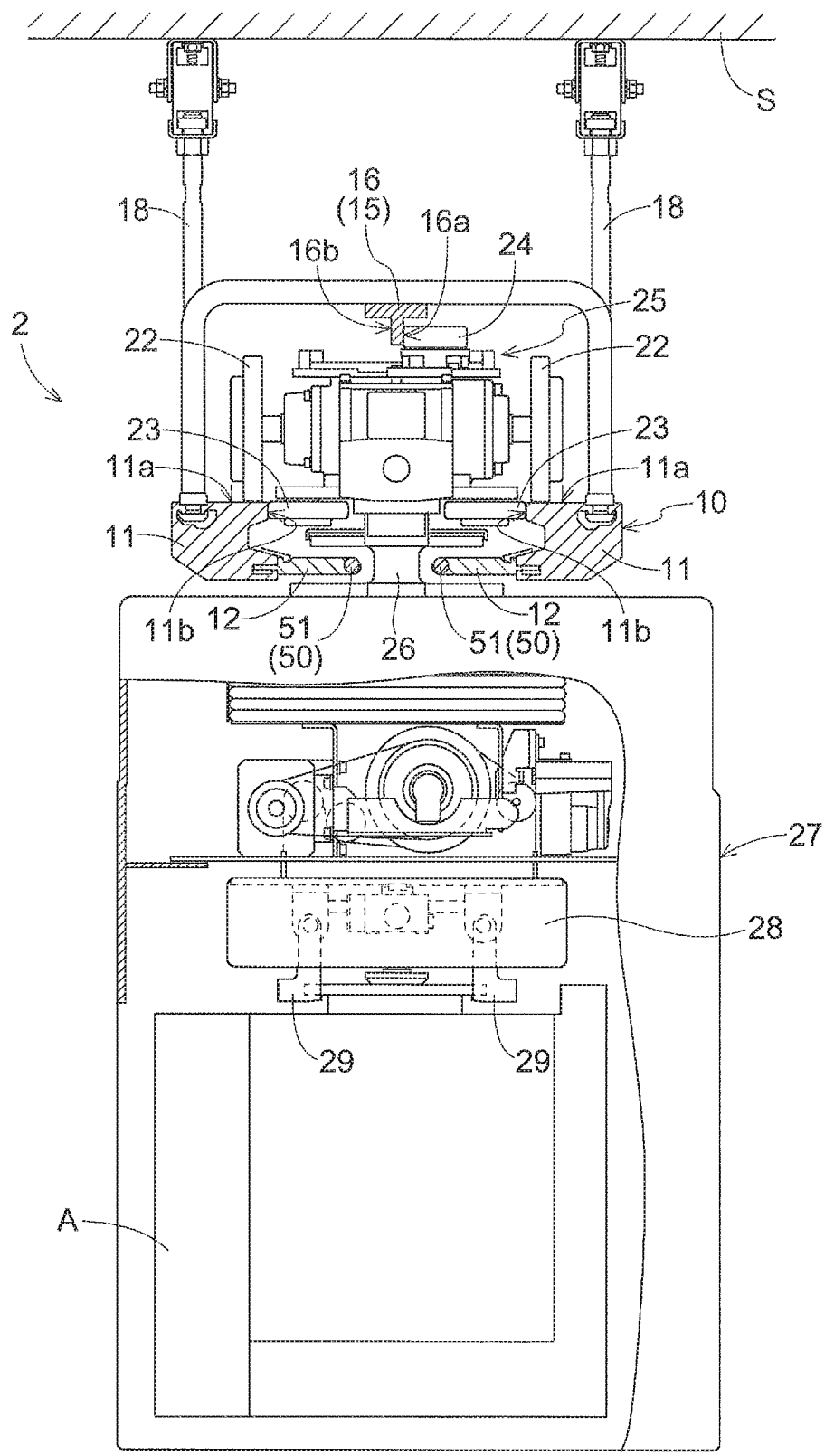
FIG. 3 is a front view of the article transport device.

An embodiment of the article transport facility will be described. In the present embodiment, an article transport facility 1 that is used in a manufacturing facility or the like of various products will be described as an example. The article transport facility 1 of the present embodiment is used, for example, to transport materials, intermediate products, finished products, and the like in a manufacturing process of semiconductor products and the like. In the following, the article transport facility 1 of the present embodiment will be described in detail.

As shown in FIGS. 1 to 4, the article transport facility 1 includes a traveling rail 10 provided along a transport path R, and an article transport device 2 that travels along the traveling rail 10 to transport an article A. Examples of the article A include a container (Front Opening Unified Pod; FOUP) accommodating a semiconductor substrate. As shown in FIGS. 5 to 8, the article transport facility 1 of the present embodiment further includes a cleaning device 3 that travels along the same traveling rail 10 as the article transport device 2 and performs a cleaning operation on a predetermined cleaning target location T.

As shown in FIG. 1, the transport path R (traveling path of the article transport device 2) is formed so as to pass through a plurality of article processing portions 9. In addition, the transport path R is formed in a loop shape including a straight segment Is and a curve segment Ic. Note that the straight segment Is and the curve segment Ic as used herein are concepts focusing on the shape of the segments, and are concepts different from set traveling segments for transport control. For example, a plurality of continuous set traveling segments may be included in one straight segment Is, and a plurality of continuous set traveling segments may be included in one curve segment Ic. It is, of course, possible to adopt a configuration in which only one set traveling segment is included in one straight segment Is or one curve segment Ic.

Although not shown, a plurality of subunits shown in FIG. 1 are assembled, and the subunits are formed in a loop shape as a whole. Furthermore, a plurality of units each composed of a plurality of subunits may be assembled, and the units may be formed in a loop shape as a whole. In this manner, the transport path R is composed of a combination of the straight segment Is and the curve segment Ic, and is formed so as to be endless such that the article transport device 2 and the cleaning device 3 can travel toward a fixed direction (the direction indicated by the arrow in the drawing). In the following, the direction in which the article transport device 2 and the cleaning device 3 travel may be referred to as "front-rear direction", and a direction orthogonal to the traveling direction in plan view is referred to as "width direction (or left-right direction)".

As shown in FIG. 3, the traveling rail 10 is provided in the vicinity of a ceiling S of a building in which the article transport facility 1 is installed. The traveling rail 10 includes a pair of rail bodies 11 provided so as to be spaced apart in the width direction. The traveling rail 10 (rail bodies 11) is suspended and supported by suspension support members 18 suspended from the ceiling S. The pair of rail bodies 11 are disposed so as to be bilaterally symmetrical. Each of the pair of left and right rail bodies 11 includes a traveling wheel supporting surface 11a that supports, from below, a traveling wheel 22 included in a traveling portion 21 of the article transport device 2 and a traveling wheel 32 included in a traveling portion 30 of the cleaning device 3, and a guiding wheel contact surface 11b coming into contact, from outward in the width direction, with a guiding wheel 23 included in the traveling portion 21 of the article transport device 2 and a guiding wheel 33 included in the traveling portion 30 of the cleaning device 3.

In the present embodiment, the traveling rail 10 further includes a pair of support members 12 each extending inward in the width direction from the corresponding one of the pair of rail bodies 11. Each support member 12 is fixed to a lower end portion of the corresponding rail body 11. The pair of support members 12 are disposed such that their extending distal end portions oppose each other at a predetermined interval. Then, a feeding line 51 constituting a feeding portion 50 is supported from below by the extending distal end portion of each of the support members 12. In this manner, a pair of left and right feeding lines 51 are provided along the transport path R, as with the traveling rail 10.

In the present embodiment, the extension length (length in the width direction) of the support member 12 may differ depending on the position in the transport path R. Specifically, the length of the support member 12 located on the inner side of the curve in the curve segment Ic in the transport path R is set to be shorter than the length of that support member 12 in the straight segment Is (see FIG. 15). Then, the feeding line 51 located on the inner side of the curve in the curve segment Ic is provided so as to be offset to the inner side of the curve accordingly. Consequently, the spacing between the pair of support members 12 in the curve segment Ic is longer than the spacing between the pair of support members 12 in the straight segment Is.

As shown in FIG. 3, the article transport facility 1 further includes a guide rail 15 for guiding the advancement direction of the article transport device 2 and the cleaning device 3 at a branch point B of the transport path R. Above the traveling rail 10, the guide rail 15 is fixed to a U-shaped frame body 19 fixed across the pair of rail bodies 11. The guide rail 15 is fixed to the lower surface of the frame body 19 at a central position in the width direction. The guide rail 15 is constituted by a guide piece 16 having a T-shaped vertical cross section. The guide rail 15 (guide piece 16) includes a roller first contact surface 16a coming into contact, from one side in the width direction, with a guide roller 24 included in the traveling portion 21 of the article transport device 2 and a guide roller 34 included in the traveling portion 30 of the cleaning device 3, and a roller second contact surface 16b coming into contact, from the other side in the width direction, with the guide rollers 24 and 34. The guide rail 15 is bifurcated at the branch point B of the transport path R.

Figure 4:
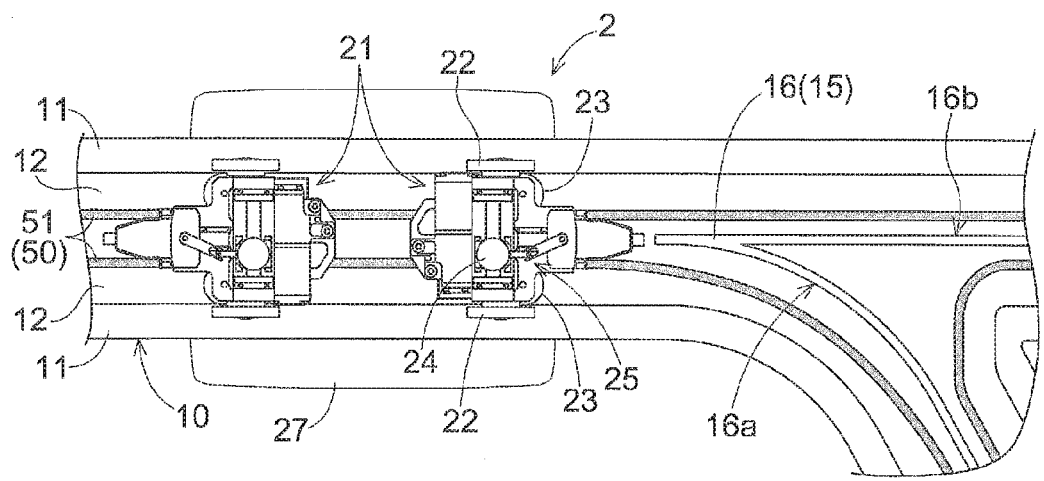
FIG. 4 is a plan view showing a state of the article transport device at a branch point of the transport path.

As shown in FIGS. 2 to 4, the article transport device 2 includes a traveling portion 21 that travels on the traveling rail 10, and a transfer unit 27 that performs an operation of transferring an article A to and from a support platform 91 (see FIG. 1), which is a transport target location, of the article processing portion 9. In the present embodiment, the article transport device 2 includes a pair of front and rear traveling portions 21, and each of the pair of traveling portions 21 is coupled to the transfer unit 27 via a coupling shaft 26. Each traveling portion 21 is rotatable relative to the transfer unit 27 around the axis of the coupling shaft 26 that extends along the up-down direction.

Each of the pair of traveling portions 21 includes a pair of left and right traveling wheels 22 that are rotationally driven by an electrically powered drive motor. The traveling wheels 22 roll on the traveling wheel supporting surfaces 11a of the rail bodies 11. Each of the pair of traveling portions 21 includes a pair of left and right guide wheels 23 capable of being freely rotated about the axis extending along the up-down direction. Two pairs of left and right guide wheels 23 are provided so as to be arranged in the front-rear direction (four for each pair of front and rear traveling portions 21). Each guiding wheel 23 comes into contact with the guiding wheel contact surface 11b of the corresponding rail body 11. Each of the pair of traveling portions 21 includes a guide roller 24 capable of being freely rotated about the axis extending along the up-down direction, and a switching mechanism 25 that switches the position, in the width direction, of the axis of the guide roller 24. Each guide roller 24 can be switched by the switching mechanism 25 between a state in which it is in contact with the roller first contact surface 16a of the guide rail 15 (guide piece 16) and a state in which it is in contact with the roller second contact surface 16b. The state of the switching mechanism 25 is controlled according to the advancement direction of the article transport device 2 at the branch point B of the transport path R.

The transfer unit 27 suspended and supported by the pair of traveling portions 21 includes an article holding portion 28 accommodated in a casing. The article holding portion 28 includes a pair of gripping claws 29 that grip a flange portion formed at an upper portion of the article A. The pair of gripping claws 29 are driven by a gripping motor so as to be switchable between a gripping position at which they grip the article A and a releasing position at which they release the gripping of the article A. Note that the transfer unit 27 includes an elevation mechanism that moves the article holding portion 28 along the up-down direction, a slide mechanism that moves the article holding portion 28 along the width direction, and a rotating mechanism that rotates the article holding portion 28 about the axis extending along the up-down direction. The elevation mechanism, slide mechanism, rotating mechanism, and pair of gripping claws 29 perform, in conjunction with one another, delivery and reception of the article A to and from the support platforms 91 as a transport source and a transport destination.

The article transport device 2 is driven with power supplied from a feeding portion 50. In the present embodiment, a noncontact feeding method is used, and the feeding portion 50 includes feeding lines 51 provided on the traveling rail 10 side, and power receiving coils (not shown) provided on the article transport device 2 side.

Figure 5:
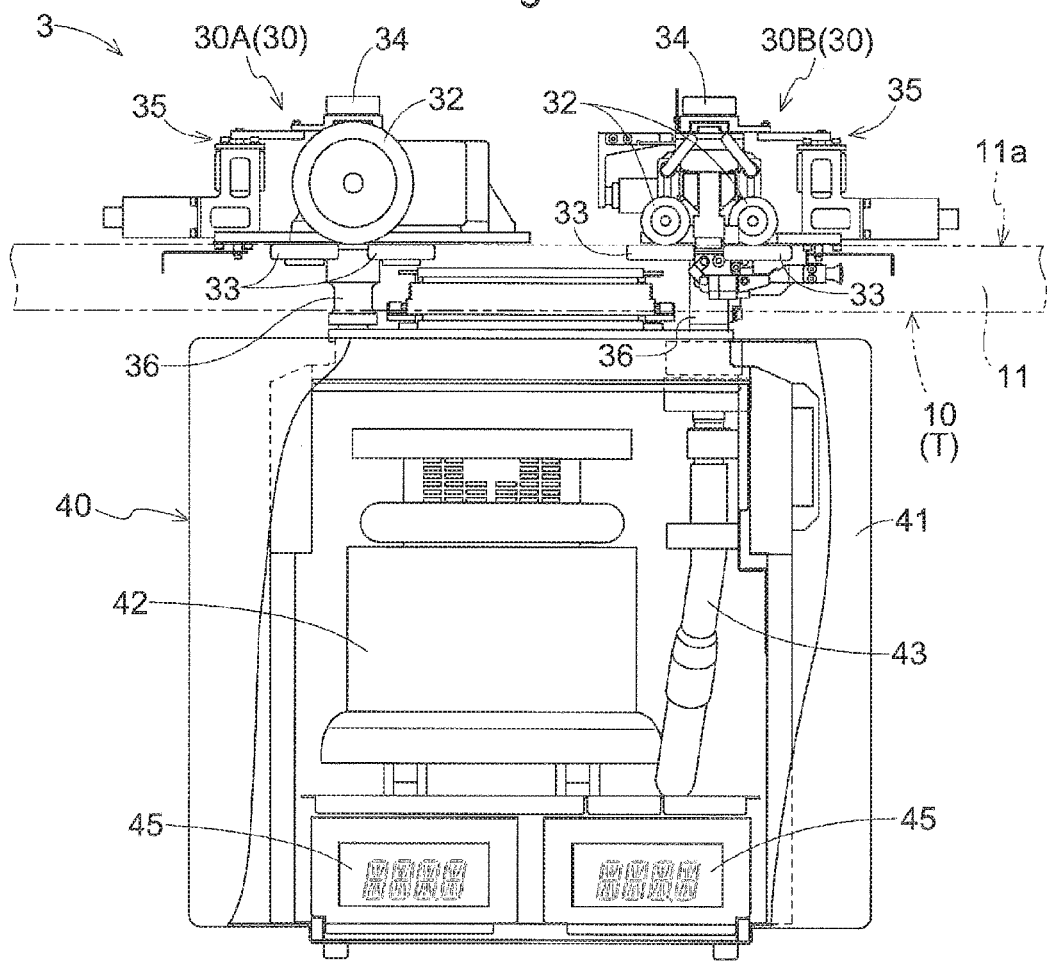
FIG. 5 is a side view of a cleaning device.

As shown in FIG. 5, the cleaning device 3 includes a traveling portion 30 that travels on the traveling rail 10, and a cleaning unit 40 that performs cleaning operation on the predetermined cleaning target location T. In the present embodiment, the cleaning device 3 includes a pair of front and rear traveling portions 30 (a first traveling portion 30A and a second traveling portion 30B), and each of the pair of traveling portions 30A and 30B is coupled to the cleaning unit 40 via a coupling shaft 36. Each of the traveling portions 30A and 30B is rotatable relative to the cleaning unit 40 about the axis of the coupling shaft 36 that extends in the up-down direction. The first traveling portion 30A, which is one of the pair of traveling portions 30A and 30B, has the same configuration as that of the traveling portion 21 of the article transport device 2. That is, the first traveling portion 30A includes a pair of traveling wheels 32 that are rotationally driven by an electrically powered drive motor, a pair of guiding wheels 33, a guide roller 34, and a switching mechanism 35.

Figure 6:
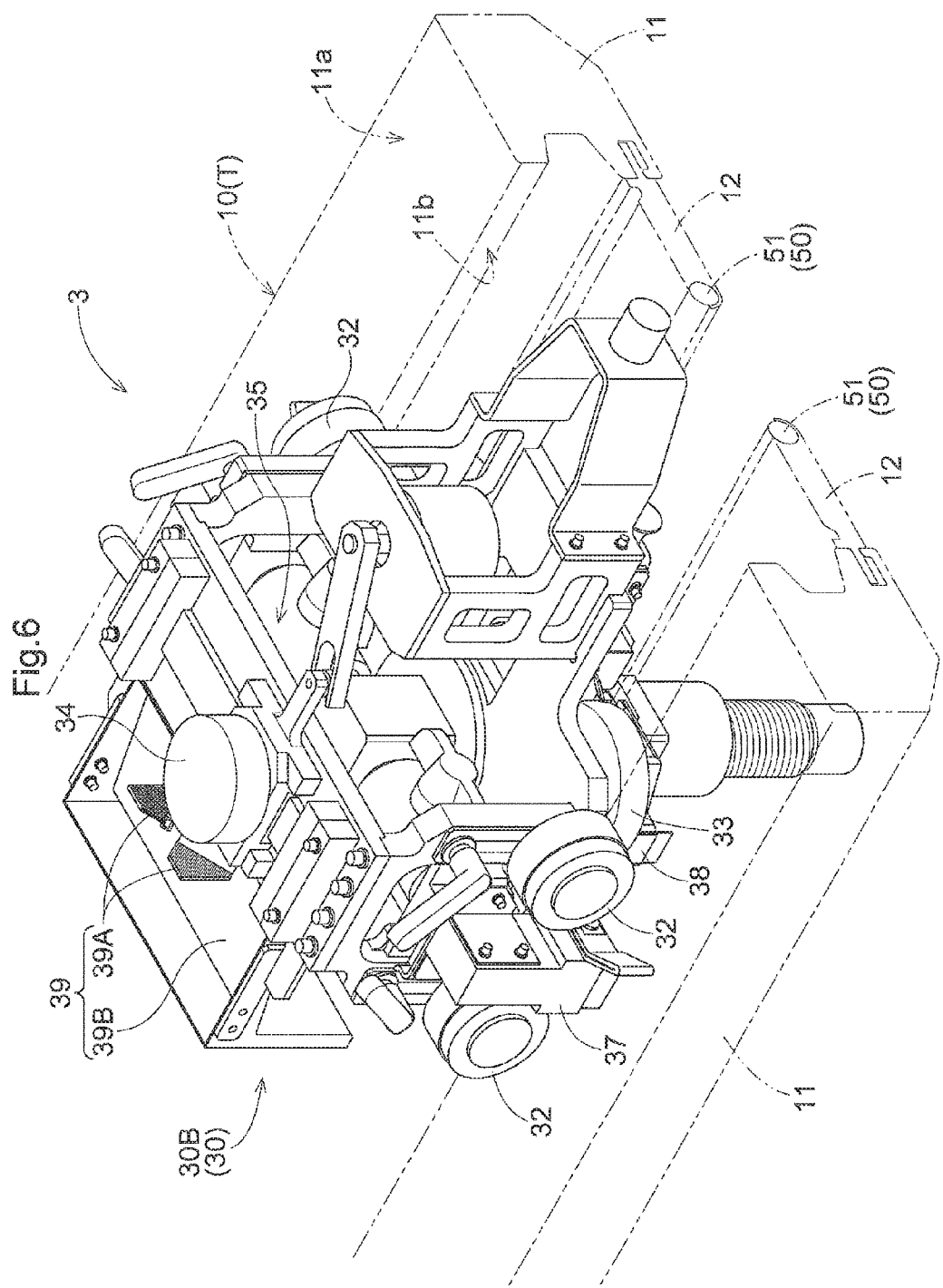
FIG. 6 is a perspective view of the cleaning device.
Figure 7:
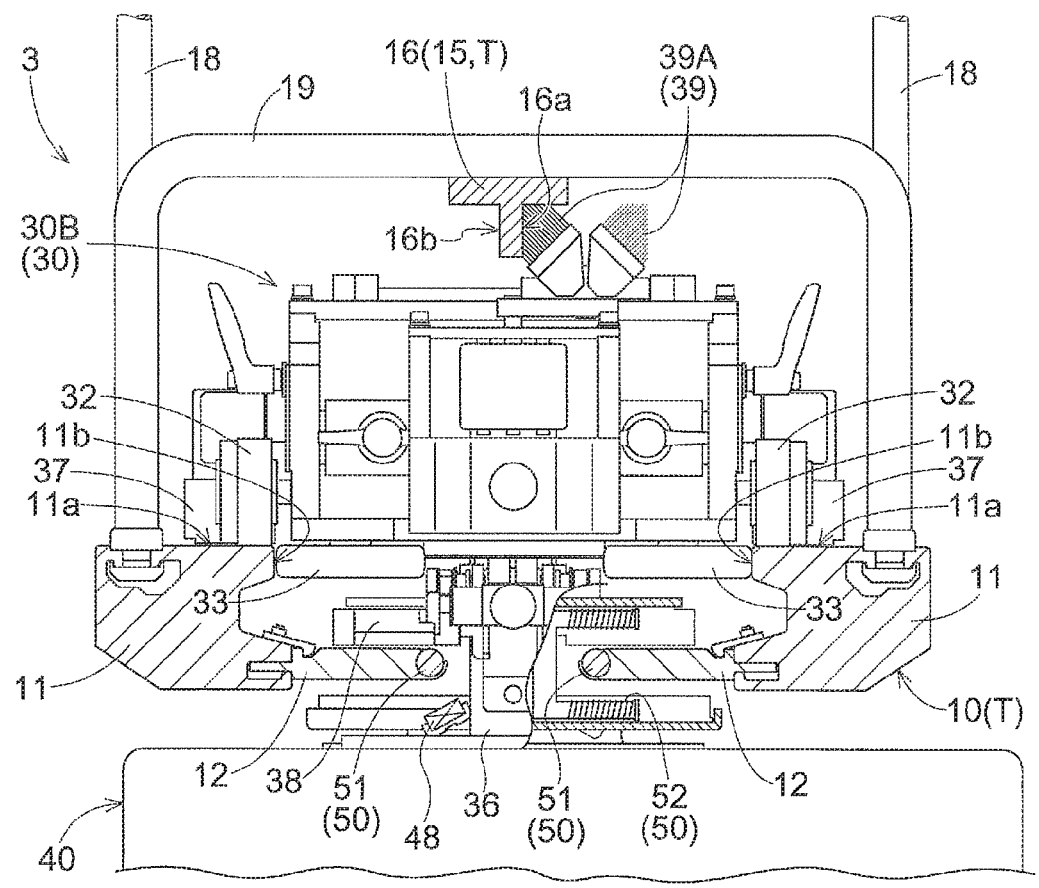
FIG. 7 is a front view of the cleaning device.

The second traveling portion 30B, which is the other of the pair of traveling portions 30A and 30B, further includes first cleaning portions 37, second cleaning portions 38, and a third cleaning portion 39 as shown in FIGS. 6 and 7, in addition to the pair of traveling wheels 32, the pair of guiding wheels 33, the guide roller 34, and the switching mechanism 35. At least the traveling rail 10 is included in the cleaning target location T, which is an area to be subjected to a cleaning operation performed by the cleaning unit 40. In the present embodiment, the traveling rail 10 and the guide rail 15 are the cleaning target locations T. More specifically, the traveling wheel supporting surface 11a of each rail body 11, the upper surface of each support member 12, the roller first contact surface 16a and the roller second contact surface 16b of each guide piece 16, and the lower surface of the guide piece 16 are the cleaning target locations T.

As shown in FIG. 7, the pair of left and right first cleaning portions 37 are installed such that their suction inlets oppose the traveling wheel supporting surfaces 11a of the respective corresponding rail bodies 11. The pair of left and right second cleaning portions 38 are installed such that their suction inlets oppose the upper surfaces of the respective corresponding support members 12. The suction inlet of each of the first cleaning portions 37 and the second cleaning portions 38 is in communication with a cleaner 42 installed in a casing 41, via an internal air passage and a hose 43. When the cleaner 42 is driven, the suction force of the cleaner 42 causes each first cleaning portion 37 to operate to suction the traveling wheel supporting surface 11a of the corresponding rail body 11, and causes each second cleaning portion 38 to operate to suction the upper surface of the corresponding support member 12.

As shown in FIG. 6, the third cleaning portion 39 includes a dust removal brush 39A capable of moving in the width direction in response to the movement of the guide roller 34, and a tray portion 39B installed rearward and downward of the dust removal brush 39A in the traveling direction so as to be upwardly open. In the present embodiment, a pair of left and right dust removal brushes 39A are provided, one of the dust removal brushes 39A comes into slidable contact with the roller first contact surface 16a of the corresponding guide piece 16 and the lower surface extending continuously therewith (see FIG. 7), and the other dust removal brush 39A comes into slidable contact with the roller second contact surface 16b of the corresponding guide piece 16 and the lower surface extending continuously therewith. Each dust removal brush 39A operates to scrape the roller first contact surface 16a of the corresponding guide piece 16 and the lower surface extending continuously therewith, or the roller second contact surface 16b and the lower surface extending continuously therewith, according to the state of the switching mechanism 35. The dust scraped off by the dust removal brush 39A is collected in the tray portion 39B. The tray portion 39B is provided with a suction inlet, and the suction inlet is in communication with the cleaner 42 via the internal air passage and the hose 43. When the cleaner 42 is driven, the dust that has been scraped off by the dust removal brushes 39A and collected in the tray portion 39B is suctioned and removed by the suction force of the cleaner 42.

Note that the first cleaning portions 37, the second cleaning portions 38, and the third cleaning portion 39 may be configured to be subjected to the suction operation performed by the cleaner 42 either simultaneously or alternatively. In the latter case, the cleaning unit 40 may preferably include an interruption mechanism for selectively interrupting the communication between each of the cleaning portions 37 to 39 and the cleaner 42.

Figure 8:
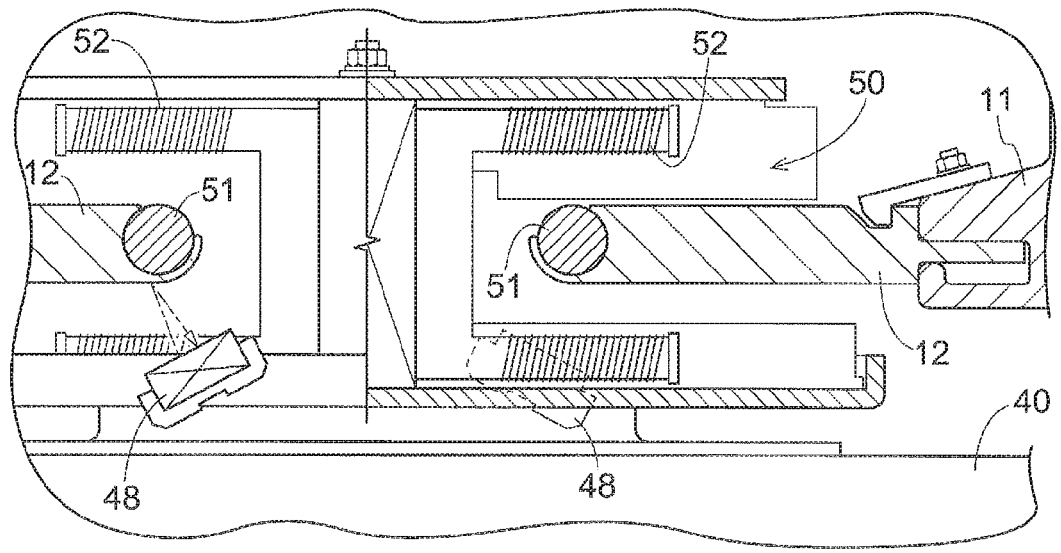
FIG. 8 is an enlarged view of relevant portions of FIG. 7.

The cleaning device 3 is mainly driven by the power supplied from the feeding portion 50. As described above, a noncontact feeding method is used in the present embodiment, and the feeding portion 50 includes the feeding lines 51 provided on the traveling rail 10 side, and the power receiving coils 52 provided on the cleaning device 3 side, as shown in FIGS. 7 and 8. Each power receiving coil 52 is formed by secondary winding wound around a core, and is disposed at a position overlapping the corresponding feeding line 51 in plan view. The feeding portion 50 converts, by electromagnetic induction, a magnetic field of a high-frequency current flowing through the feeding line 51 on the primary side into an electromotive force generating in the power receiving coil 52 on the secondary side, and supplies DC power to the cleaning device 3 (the traveling portion 30 and the cleaning unit 40). The feeding portion 50 supplies at least traveling driving power to the traveling portion 30 and cleaning driving power to the cleaning unit 40.

In the present embodiment, the cleaning device 3 includes a power storage device 54 (see FIG. 9) capable of being charged and discharged. The power storage device 54 is configured to be capable of charging the power received from the outside, and be capable of discharging power to a power load. As the power storage device 54, it is possible to use, for example, a capacitor such as an electric double layer capacitor or a lithium ion capacitor, or a storage battery such as a lithium ion secondary battery and a nickel-metal hydride rechargeable battery.

Referring to a feeding system for the cleaning device 3 with reference to FIG. 9, the traveling portion 30 and the cleaning unit 40 are electrically connected in parallel to the feeding portion 50. The power storage device 54 is electrically connected between the feeding portion 50 and the cleaning unit 40. The power storage device 54 is connected between the feeding portion 50 and the cleaning unit 40 via a converter 56. The feeding portion 50 and the power storage device 54 connected in parallel with each other are connected to the cleaning unit 40 via a contactor 57 and an inverter 58. The converter 56 transforms (raises or lowers) an input DC voltage. The contactor 57 switches the conduction state (on/off). The inverter 58 converts an input DC voltage to an AC voltage.

As shown in FIG. 9, a controller 6 that controls the driving state of the cleaning device 3 includes a traveling control portion 61 and a power control portion 62. The traveling control portion 61 controls the traveling state of the traveling portion 30. The traveling control portion 61 controls the traveling speed (including zero) of the traveling portion 30, for example, by controlling the driving of a drive motor coupled so as to be capable of transmitting a driving force to the traveling wheels 32. The traveling control portion 61 also controls the advancement direction of the traveling portion 30 at the branch point B of the transport path R, for example, by controlling the driving of a drive motor for switching the state of the switching mechanism 25. The power control portion 62 controls the flow of power (charging/discharging) centered on the power storage device 54 and the ratio of transformation or the like between the input voltage and the output voltage, for example, by controlling the operation of the converter 56. The power control portion 62 also controls the state of power supply (conducted/interrupted) to the cleaning unit 40, for example, by controlling the operation of the contactor 57.

The article transport facility 1 of the present embodiment is characterized in that the power control portion 62 charges the power storage device 54 with power corresponding to the driving state of the traveling portion 30 and the position of the traveling portion 30 along the transport path R. In the present embodiment, "driving state of the traveling portion 30" includes a state in which the traveling portion 30 is traveling and a state in which the traveling portion 30 is stopped. The power control portion 62 charges, in a state in which the traveling portion 30 is stopped, the power storage device 54 with power greater than or equal to the power used when charging the power storage device 54 in a state in which the traveling portion 30 is traveling.

Further, "position of the traveling portion 30 along the transport path R" includes at least a straight segment Is and a curve segment Ic of the transport path R. In the present embodiment, in addition to these, the branch point B is further included in "position of the traveling portion 30 along the transport path R". Note that in the present embodiment, the branch point B is a concept including a point (branch point in a general sense) of the transport path R at which the traveling path of the traveling portion 30 is divided in two, and a point (merging point) at which two traveling paths are merged into one. The power control portion 62 charges, in a state in which the traveling portion 30 is located in the straight segment Is, the power storage device 54 with power greater than or equal to the power used when charging the power storage device 54 in a state in which the traveling portion 30 is located in the curve segment Ic. In the present embodiment, the power control portion 62 charges, in a state in which the traveling portion 30 is located at the branch point B, the power storage device 54 with power equal to the power used when charging the power storage device 54 in a state in which the traveling portion 30 is located in the curve segment Ic. In other words, in the present embodiment, the power control portion 62 handles, in terms of control, the curve segment Ic and the branch point B as equal positions.

The power control portion 62 switches between four control modes, from a first control mode to a fourth control mode, according to the driving state (traveling/stopped) of the traveling portion 30 and the position (straight segment Is/curve segment Ic or the branch point B) of the traveling portion 30 along the transport path R. Note that the driving state of the traveling portion 30 can be determined, for example, based on a control signal to the traveling portion 30 from the traveling control portion 61. The position of the traveling portion 30 can be determined, for example, based on traveling segment information (information obtained by detecting a mark (e.g., a barcode label provided with address information) provided for each set traveling segment of the transport path R)) for transport control that can be acquired by the controller 6. To perform a finer position determination, the cleaning device 3 may be equipped with a suitable sensor different from a mark detection sensor, and position determination may be performed based on a result of detection performed by the sensor. This will be described later.

As shown in FIG. 10, the first control mode is executed in a state in which the traveling portion 30 is traveling in the straight segment Is. As shown in FIG. 11, in the first control mode, the power received from the feeding portion 50 is supplied so as to be distributed to the traveling portion 30 and the cleaning unit 40. In the straight segment Is, a relatively (e.g., compared with the curve segment Ic and the branch point B) high power receiving efficiency is achieved in the feeding portion 50. Accordingly, even if the power received from the feeding portion 50 has been consumed by the traveling portion 30 and the cleaning unit 40, a sufficient surplus power may often still be generated. Therefore, in the first control mode, the power control portion 62 charges the power storage device 54 with second set power W2 that has been preset to a positive value.

Here, the power received from the feeding portion 50 in the straight segment Is can be determined in advance by calculation or actual measurement. Although the traveling driving power for driving the traveling portion 30 may differ depending on the situation, for example, power consumed during acceleration in which a relatively large power consumption is expected can be determined in advance by calculation or actual measurement, and this may be used as an assumed maximum traveling driving power in the straight segment Is. As for the cleaning driving power for driving the cleaning unit 40, power consumed during a cleaning operation performed with a maximum suction force that can be achieved by the cleaner 42 can be determined in advance by calculation or actual measurement, and this may be used as an assumed maximum cleaning driving power. Based on these, the second set power W2 is set to be a value obtained by subtracting, from the power received in the straight segment Is, the assumed maximum traveling driving power, the assumed maximum cleaning driving power, and a predetermined margin.

Figure 12:
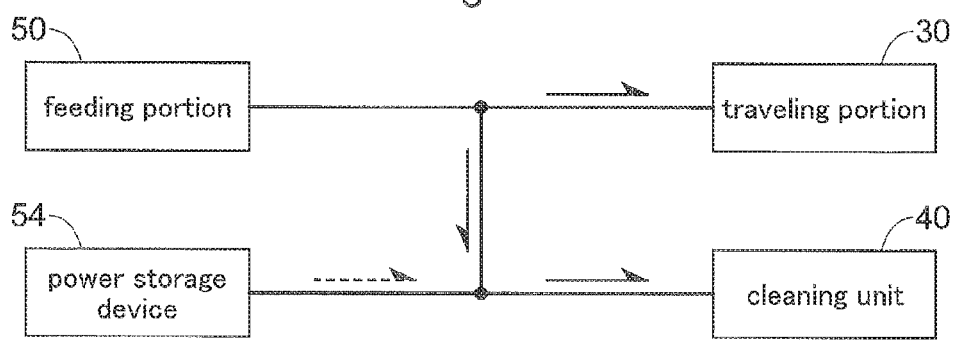
FIG. 12 is a schematic diagram showing a feeding state in a second control mode.
Figure 13:
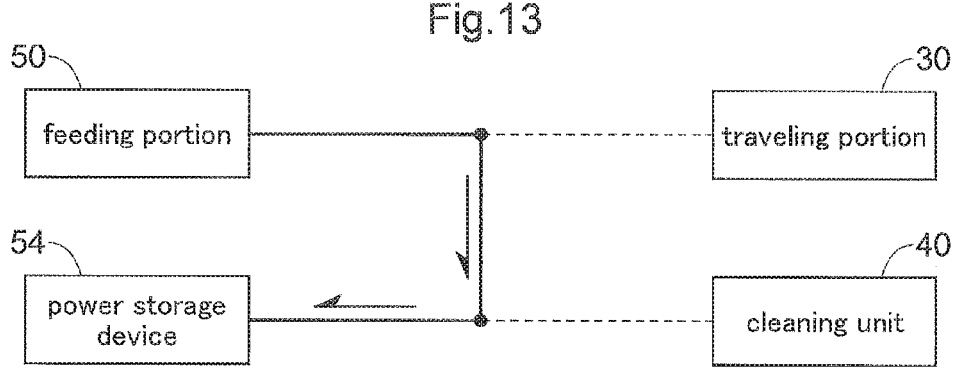
FIG. 13 is a schematic diagram showing a feeding state in a third control mode and a fourth control mode.

As shown in FIG. 10, the second control mode is executed in a state in which the traveling portion 30 is traveling in the curve segment Ic or at the branch point B. As shown in FIG. 12, in the second control mode, the power received from the feeding portion 50 is supplied so as to be distributed to the traveling portion 30 and the cleaning unit 40. In the curve segment Ic and the branch point B, a power receiving efficiency in the feeding portion 50 is relatively (e.g., compared with the straight segment Is) low. Accordingly, a surplus power cannot be expected too much when the power received from the feeding portion 50 has been consumed by the traveling portion 30 and the cleaning unit 40. Therefore, in the second control mode, the power control portion 62 charges the power storage device 54 with the first set power W1 that has been preset to a value smaller than the second set power W2. Note that "charges with the first set power W1" is a concept including "not charging" when the first set power W1 is "zero".

Here, the power received from the feeding portion 50 in the curve segment Ic and the branch point B can be determined in advance by calculation or actual measurement, and the smaller one of the determined powers may be used as the power received in the curve segment Ic or the branch point B. Since constant velocity traveling is often performed in the curve segment Ic and the branch point B, the traveling driving power for driving the traveling portion 30 can be determined, for example, by determining, in advance, power consumed during constant velocity traveling in the curve segment Ic and the branch point B by calculation or actual measurement, and the larger one of the determined consumed powers may be used as an assumed maximum traveling driving power in the curve segment Ic or the branch point B. As for the cleaning driving power for driving the cleaning unit 40, power consumed during a cleaning operation performed with a maximum suction force that can be achieved by the cleaner 42 may be used as an assumed maximum cleaning driving power, as described above. Based on these, the first set power W1 can be set to a value obtained, for example, by subtracting, from the power received in the curve segment Ic or the branch point B, the assumed maximum traveling driving power, the assumed maximum cleaning driving power, and a predetermined margin.

In the present embodiment, since the curve segment Ic and the branch point B are handled without being strictly differentiated in terms of control, the power received in the curve segment Ic or the branch point B tends to be evaluated to be small, and the assumed maximum traveling driving power tends to be evaluated to be large. Therefore, in the case of setting the first set power W1 in the above-described manner, the calculated value may be a negative value when a sufficiently large margin is to be ensured. In view of this circumstance, in the present embodiment, the first set power W1 used when charging the power storage device 54 is set to zero. In other words, the power control portion 62 inhibits charging of the power storage device 54 in the second control mode.

Furthermore, in the curve segment Ic and the branch point B, a situation may actually occur in which the power received from the feeding portion 50 is insufficient relative to a total power of the traveling driving power to the traveling portion 30 and the cleaning driving power to the cleaning unit 40. In such a case, the power control portion 62, on the contrary, discharges the power storage device 54 in order to supply power to the cleaning unit 40. That is, in the second control mode, the power control portion 62 normally does not charge or discharge the power storage device 54, and discharges the power storage device 54 if there is a shortage of power when the power received from the feeding portion 50 has been consumed by the traveling portion 30 and the cleaning unit 40. In this manner, the article transport facility 1 of the present embodiment is also characterized in that the power control portion 62 discharges the power storage device 54 in order to supply power to the cleaning unit 40 when the power received from the feeding portion 50 is insufficient relative to a total power of the traveling driving power and the cleaning driving power.

In the second control mode, the power storage device 54 is only discharged, without being charged, so that the stored power amount may significantly decrease, depending on the case. When the stored power amount significantly decreases, the cleaning operation performed by the cleaning unit 40 cannot be continued. Therefore, in consideration of an easy differentiation between the segment for which the cleaning operation has been completed and the segment for which the cleaning operation has not been completed, the traveling control portion 61 of the present embodiment is configured to stop the traveling portion 30 at a point of time when the stored power amount in the power storage device 54 has decreased to a predetermined first reference amount during traveling of the traveling portion 30. The first reference amount may be set, for example, to a value of about 1% to 20% relative to the stored power amount in a fully charged state. In the present embodiment, the first reference amount corresponds to "reference amount". In this case, at the same time, the power control portion 62 controls the contactor 57 to be off so as to interrupt the supply of power to the cleaning unit 40. In this manner, in the present embodiment, during execution of the second control mode, the traveling portion 30 may be stopped in the curve segment Ic or the branch point B in a state in which the driving of the cleaning unit 40 is stopped.

As shown in FIG. 10, the third control mode is executed in a state in which the traveling portion 30 is stopped in the curve segment Ic or the branch point B. As shown in FIG.

13, in the third control mode, the power received from the feeding portion 50 is supplied to the power storage device 54, without being supplied to the traveling portion 30 and the cleaning unit 40. In this case, all of the power received from the feeding portion 50 is supplied to the power storage device 54. As described above, the power received from the feeding portion 50 in the curve segment Ic and the branch point B can be determined in advance by calculation or actual measurement, and the smaller one of the determined powers can be used as the power received in the curve segment Ic or the branch point B. Experimentally, the power received in the curve segment Ic or the branch point B often has a value close to a value obtained by subtracting, from the power received in the straight segment Is, the assumed maximum traveling driving power and the assumed maximum cleaning driving power. Therefore, in consideration of a simplified control, in the present embodiment, the same set charging power is used for the set charging power of the power storage device 54 in the third control mode and the set charging power of the power storage device 54 in the first control mode. That is, in the third control mode, the power control portion 62 charges the power storage device 54 with the second set power W2 that is equal to the set charging power of the power storage device 54 in the first control mode.

Although an example has been described here in which the second set power W2 is set based on the power received in the straight segment Is, the assumed maximum traveling driving power, and the assumed maximum cleaning driving power, and the second set power W2 is used in both the first control mode and the third control mode, the present invention is not limited to such a configuration. For example, the second set power W2 may be set to a value obtained by subtracting a predetermined margin from the smaller one of the powers respectively received in the curve segment Ic and the branch point B, and the second set power W2 is used in both the first control mode and the third control mode. Alternatively, a candidate value of the second set power W2 may be calculated by each of the above-described two methods, the smaller one of the candidate values may be used as a normal second set power W2, and the second set power W2 may be used in both the first control mode and the third control mode.

Although the power receiving efficiency in the curve segment Ic and the branch point B is relatively low, the power received from the feeding portion 50 is not consumed by the traveling portion 30 and the cleaning unit 40. Accordingly, the power storage device 54 can be charged relatively quickly. In the present embodiment, when the stored power amount in the power storage device 54 has increased to a second reference amount that has been preset to a value greater than the first reference amount during execution of the third control mode, the power control portion 62 controls the contactor 57 to be on so as to connect the feeding portion 50 and the power storage device 54 to the cleaning unit 40. Consequently, the cleaning operation by the cleaning unit 40 is resumed by the power supplied from the feeding portion 50 or the power storage device 54. In accordance therewith, the traveling control portion 61 resumes the traveling of the traveling portion 30. The second reference amount may be set to, for example, a value of about 80% to 100% relative to the stored power amount in a fully charged state.

As shown in FIG. 10, the fourth control mode is executed in a state in which the traveling portion 30 is stopped in the straight segment Is. The details of the basic control of the fourth control mode are the same as those of the third control mode, except that the set charging power of the power storage device 54 is different. In the fourth control mode, all of the power received from the feeding portion 50 is supplied to the power storage device 54. The power receiving efficiency in the straight segment Is is relatively high, and a large amount of received power can be supplied for charging of the power storage device 54. Therefore, in the fourth control mode, the power control portion 62 charges the power storage device 54 with third set power W3 that has been preset to a value greater than the second set power W2, which is the set charging power of the power storage device 54 in the third control mode.

As described above, the power received from the feeding portion 50 in the straight segment Is can be determined in advance by calculation or actual measurement. The third set power W3 is set to, for example, a value obtained by subtracting a predetermined margin from the power received in the straight segment Is. In the fourth control mode, the power storage device 54 can be charged even more quickly than in the third control mode.

In this manner, the power control portion 62 of the present embodiment sets the first set power W1 to zero to inhibit charging of the power storage device 54 in the second control mode, charges the power storage device 54 with the second set power W2 (W2>W1) in the first control mode and the third control mode, and charges the power storage device 54 with the third set power W3 (W3>W2) in the fourth control mode. That is, for the four control modes set according to the combination of the driving state (traveling/stopped) and the position (straight segment Is/curve segment Ic) of the traveling portion 30, charging (including inhibition of charging) of the power storage device 54 is performed with any of the set powers (including zero) that have been set in three stages. Since the number of steps of the set charging powers is smaller than the number of control modes, a simplified control is achieved as compared with a configuration in which the charging power is separately set for each of the control modes.

As described above, in the present embodiment, the traveling portion 30 may be stopped as a result of a decrease in the stored power amount in the power storage device 54 during execution of the second control mode, and the mode may be shifted to the third control mode, in which the power storage device 54 is charged. Although the charging of the power storage device 54 is usually continuously performed until the stored power amount reaches the second reference amount, it is possible to adopt a configuration in which the mode is forcefully returned from the third control mode to the second control mode by a manual operation performed by the operator. For example, when the stored power amount in the power storage device 54 has not reached the second reference amount, but has reached a certain amount, it is possible to cause, with the stored power, the cleaning device 3 to advance to at least a straight segment Is located thereahead, while driving the cleaning unit 40. Once the cleaning device 3 has reached the straight segment Is, it is possible to cause the cleaning device 3 to advance while charging the power storage device 54 in the first control mode, or alternatively, to forcefully stop the traveling portion 30 in accordance with a manual operation performed by the operator so as to shift the mode to the fourth control mode, in which quick charge is performed.

In order to provide basic information for such determination to the operator, the cleaning unit 40 of the present embodiment is provided with a display portion 45 that displays an index relating to the charged state of the power storage device 54, as shown in FIG. 5, for example. The display portion 45 displays, for example, the power received in the feeding portion 50 and the voltage across the terminals of the power storage device 54 side by side so as to be contrasted with each other. Alternatively, the display portion 45 may display the stored power amount (for example, this may be in the form of a percentage (%) relative to the stored power amount in a fully charged state) of the power storage device 54. When the cleaning unit 40 is equipped with such a display portion 45, it is possible to easily notify the operator that the stored power amount in the power storage device 54 is decreasing during a cleaning operation, or that the stored power amount is being restored during charging of the power storage device 54.

Figure 14:
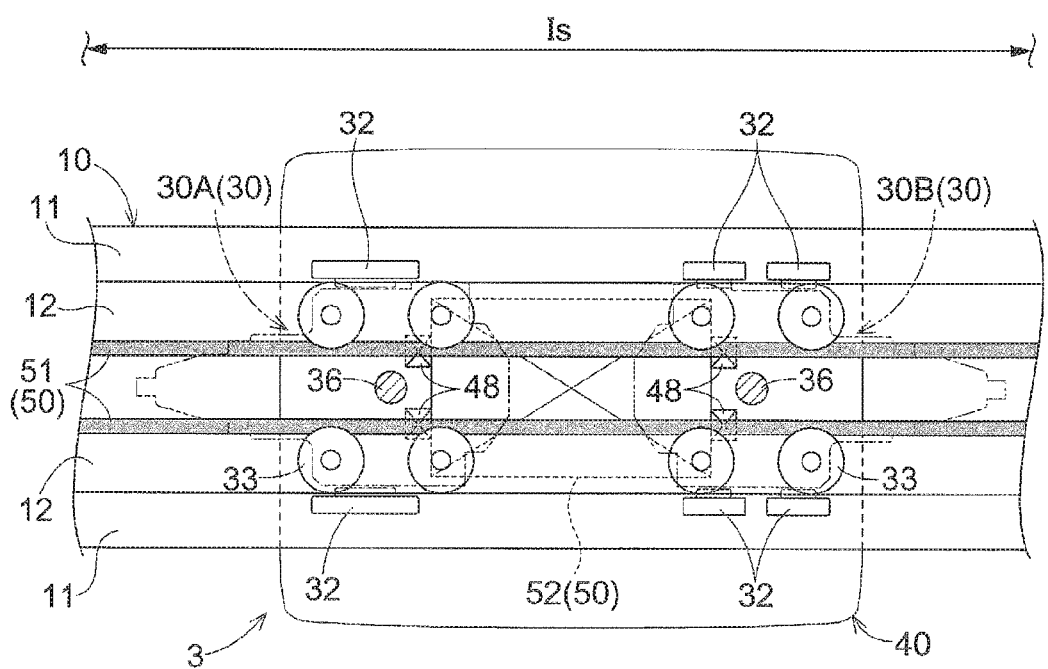
FIG. 14 is a schematic diagram showing a positional relationship between a traveling rail and the cleaning device in a straight segment.

In the present embodiment, the cleaning device 3 has the function of collecting basic information for accurately determining its position along the transport path R. In the present embodiment, such a function of collecting the basic information for position determination is achieved by detection portions 48 installed in the vicinity of the power receiving coils 52. As shown in FIGS. 7 and 8, a pair of left and right detection portions 48 are provided so as to correspond to the pair of left and right feeding lines 51 and the corresponding pair of left and right power receiving coils 52. In the present embodiment, as shown in FIG. 14, the pair of left and right detection portions 48 are provided at positions respectively overlapping the pair of front and rear traveling portions 30 in plan view. That is, two pairs of left and right detection portions 48 are separately installed at the front and the rear, and a total of four detection portions 48 are installed. As shown in FIGS. 8 and 14, each detection portion 48 is installed below the corresponding feeding line 51 at a position overlapping the feeding line 51 in plan view at least in the straight segment Is.

Each detection portion 48 operates to detect the corresponding feeding line 51 or support member 12. In the present embodiment, the feeding line 51 and the support member 12 correspond to "detection target object". As the detection portion 48, it is possible to use, for example, a diffused reflection-type photoelectric sensor including a light projecting portion and a light receiving portion. Note, however, that the present invention is not limited to such a configuration. For example, it is possible to use a magnetic sensor, an image sensor or the like as the detection portion 48 as long as it is capable of operating to detect the feeding line 51 or the support member 12 as a detection target object and determining the presence or absence thereof.

Figure 15:
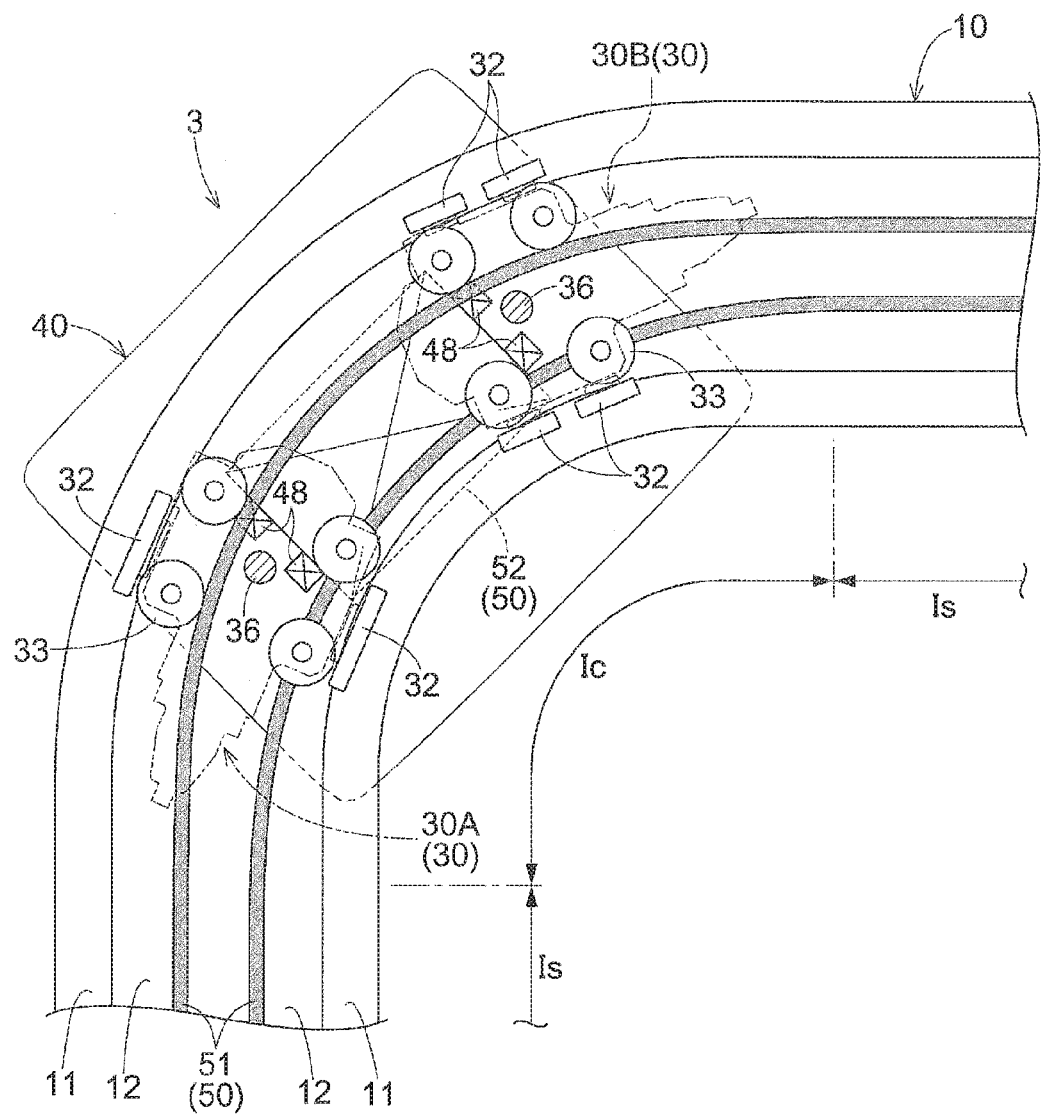
FIG. 15 is a schematic diagram showing a positional relationship between the traveling rail and the cleaning device in a curve segment.

In the straight segment Is, all of the four detection portions 48 overlap the feeding line 51 in plan view, and all of the detection portions 48 detect at least the feeding line 51 as the detection target object, as shown in FIG. 14. On the other hand, in the curve segment Ic, the length of the support member 12 located on the outer side of the curve is set to be equal to the length of that support member 12 in the straight segment Is, and the length of the support member 12 located on the inner side of the curve is set to be shorter than the length of that support member 12 in the straight segment Is, as shown in FIG. 15. Then, the feeding line 51 located on the inner side of the curve is provided so as to be offset to the inner side of the curve accordingly. Consequently, in the curve segment Ic, the two (a half of the total number of) detection portions 48 located on the outer side of the curve overlap the feeding line 51 in plan view, but the two detection portions 48 located on the inner side of the curve do not overlap any of the feeding lines 51 and the support members 12 in plan view. Thus, although the two detection portions 48 located on the outer side of the curve detect the feeding line 51, the two detection portions 48 located on the inner side of the curve do not detect any of the feeding line 51 and the support member 12.

Figure 16:
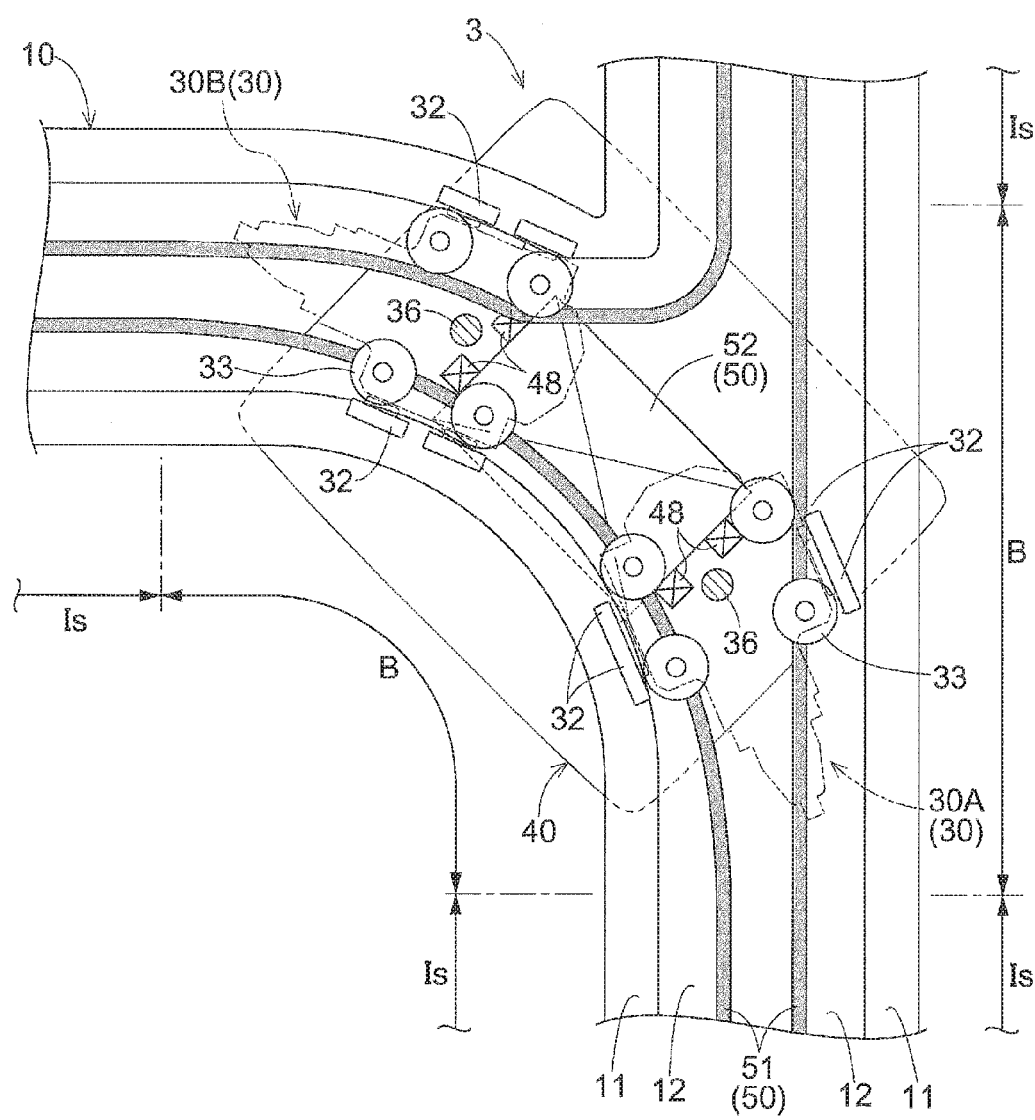
FIG. 16 is a schematic diagram showing a positional relationship between the traveling rail and the cleaning device at the branch point.

As shown in FIG. 16, at the branch point B, the feeding line 51 on the inner side of the curve is provided in the same manner as in the curve segment Ic, and the feeding lines 51 located on the outer side of the curve are provided so as to be discontinuous with each other. The two feeding lines 51 located on the outer side of the curve respectively extend from a pair of left and right feeding lines 51 provided in a straight segment Is in which they are branched (or merged). Accordingly, at the branch point B, the two detection portions 48 located on the inner side of the curve do not overlap any of the feeding lines 51 and the support members 12 in plan view, as with the curve segment Ic. According to the specific position at the branch point B, at least one of the two detection portions 48 located on the outer side of the curve also does not overlap any of the feeding lines 51 and the support members 12 in plan view. Thus, the two detection portions 48 located on the inner side of the curve and at least one detection portion 48 located on the outer side of the curve do not detect any of the feeding lines 51 and the support members 12.

In view of this situation, the power control portion 62 of the present embodiment determines that the traveling portion 30 is located in the straight segment Is if the detection target object has been detected by all of the detection portions 48. Then, the power control portion 62 executes the first control mode or the fourth control mode according to the driving state (traveling/stopped) of the traveling portion 30. On the other hand, the power control portion 62 determines that the traveling portion 30 is located in the curve segment Ic or the branch point B if the detection target object has not been detected by any of the detection portions 48. Then, the power control portion 62 executes the second control mode or the third control mode according to the driving state (traveling/stopped) of the traveling portion 30.

By doing so, it is possible to precisely determine whether the traveling portion 30 is located in the straight segment Is and the curve segment Ic or the branch point B, based on detection results (the number or ratio of the detection portions 48 that have detected the detection target object) obtained by a plurality of detection portions 48. By using the detection portions 48 installed in the cleaning device 3, the position of the traveling portion 30 of that cleaning device 3 is more directly determined, thus making it possible to perform accurate position determination. In particular, the accuracy of position determination can be increased as compared with, for example, when position determination is performed based on the traveling segment information for transport control that can be acquired by the controller 6 of the article transport facility 1. Thus, it is possible to further increase the charging efficiency of the power storage device 54.

Other Embodiments (1) The above embodiment was described, taking, as an example, a configuration in which the two pairs of left and right (a total of four) detection portions 48 are separately installed at the front and the rear. However, the present invention is not limited to such a configuration, and any number of pairs of left and right detection portions 48 may be provided. Only one pair of left and right (a total of two) detection portions 48 may be provided, or three or more pairs of left and right (a total of six, eight, . . . ) detection portions 48 may be provided.

(2) The above embodiment was described, taking, as an example, a configuration in which each detection portion 48 is installed on the side of the cleaning unit 40 located below the feeding line 51. However, the present invention is not limited to such a configuration, and the detection portion 48 may be installed, for example, on the side of the traveling portion 30 located above the feeding line 51 as long as the detection portion 48 is capable of operating to detect the feeding line 51 or the support member 12 as the detection target object and determining the presence or absence thereof.

(3) The above embodiment was described, taking, as an example, a configuration in which accurate position determination is performed by using information of detection results obtained by a plurality of detection portions 48. However, the present invention is not limited to such a configuration, and position determination may be performed, for example, based on only the traveling segment information for transport control that can be acquired by the controller 6 of the article transport facility 1, without providing the detection portion 48.

(4) The above embodiment was described, mainly assuming a configuration in which the display portion 45 included in the cleaning unit 40 numerically displays an index relating to the charged state of the power storage device 54. However, the present invention is not limited to such a configuration. For example, the display portion 45 may graphically display the power received in the feeding portion 50 and the voltage across the terminals of the power storage device 54, the stored power amount in the power storage device 54, and the like in various forms. Alternatively, such a display portion 45 may not be included in the cleaning unit 40.

(5) The above embodiment was described, taking, as an example, a configuration in which the first set power W1, which is the set charging power of the power storage device 54 in the second control mode, is set to zero (i.e., charging of the power storage device 54 is inhibited). However, the present invention is not limited to such a configuration, and the first set power W1 may be set to a positive value, for example. In this case, the power storage device 54 is charged in all of the control modes. Therefore, it is preferable that the article transport facility 1 includes a switching means for instantly switching the power storage device 54 to a discharged state without causing any error in case of a sudden shortage of power.

(6) The above embodiment was described, taking, as an example, a configuration in which the power control portion 62 charges the power storage device 54 with different set charging powers between a state in which the traveling portion 30 is stopped and a state in which the traveling portion 30 is traveling, in a comparison between the cases where the traveling portion 30 is located in the same segment. However, the present invention is not limited to such a configuration. For example, the power control portion 62 may charge the power storage device 54 with different set charging powers according to the state such as a state in which the traveling portion 30 is stopped, a state in which the traveling portion 30 is performing constant speed traveling, a state in which the traveling portion 30 is performing acceleration traveling, and a state in which the traveling portion 30 is performing deceleration traveling. Alternatively, the power control portion 62 may charge the power storage device 54 with different set charging powers, for example, according to the traveling speed or acceleration of the traveling portion 30, or a combination thereof.

(7) The above embodiment was described, taking, as an example, a configuration in which the curve segment Ic and the branch point B are handled without being strictly distinguished from each other in terms of control. However, the present invention is not limited to such a configuration, and the curve segment Ic and the branch point B may be controlled by being handled so as to be distinguished from each other. In this case, for example, it is preferable that the power control portion 62 charges, in a state in which the traveling portion 30 is located in the curve segment Ic, the power storage device 54 with power greater than or equal to the power used when charging the power storage device 54 in a state in which the traveling portion 30 is located at the branch point B and is less than or equal to the power used when charging the power storage device 54 in a state in which the traveling portion 30 is located in the straight segment Is. It is also preferable that the set charging power in a state in which the traveling portion 30 is located at the branch point B is set to zero.

In this manner, in the case of performing accurate position determination by using the detection portion 48 when the curve segment Ic and the branch point B are controlled so as to be distinguished from each other, the following can be performed, for example. That is, the power control portion 62 can determine that the traveling portion 30 is located in the curve segment Ic if the detection target object has been detected by a half of an even number of detection portions 48 (in this case, half of the detection portions 48 have not detected the detection target object). The power control portion 62 can determine that the traveling portion 30 is located at the branch point B if the detection target object has been detected by less than half of the detection portions 48 (in this case, a number of detection portions 48 that is greater than half have not detected the detection target object). The fact that the traveling portion 30 is located at the straight segment Is can be determined in the same manner as in the above embodiment.

(8) The above embodiment was described, taking, as an example, a configuration in which the segment in which the cleaning device 3 has already moved and the segment for which the cleaning operation has been completed are always substantially matched by appropriately switching between the four control modes, from the first control mode to the fourth control mode. However, the present invention is not limited to such a configuration. Depending on the case, the cleaning device 3 may be allowed to move (i.e., the segment in which the cleaning device 3 has already moved and the segment for which the cleaning operation has been completed do not match) while the cleaning unit 40 is maintained in a non-driving state. For example, under a circumstance where the subsequent article transport device 2 is forced to wait in a state in which the cleaning device 3 (traveling portion 30) is stopped and the power storage device 54 is being charged, the cleaning device 3 may be moved by a manual operation performed by the operator, while suspending the cleaning operation, in order to avoid jamming.

(9) The above embodiment was described, taking, as an example, a configuration in which the traveling rail 10 (both the rail body 11 and the support member 12) and the guide rail 15 are the cleaning target locations T. However, the present invention is not limited to such a configuration. For example, only the traveling rail 10 may be the cleaning target location T. Regardless of whether the guide rail 15 is included in the cleaning target location T, only one of the rail body 11 and the support member 12 may be the cleaning target location T. Whether or not to provide each of the cleaning portions 37 to 39 in the cleaning device 3 (traveling portion 30) is determined according to the setting of the cleaning target location T. Furthermore, an area different from the traveling rail 10 and the guide rail 15 may be the cleaning target location T. In this case, the traveling portion 30 further includes a cleaning portion for that area.

(10) The configurations disclosed in each of the embodiments described above (including the above-described embodiment and other embodiments; the same applies to the following) are applicable in combination with configurations disclosed in other embodiments so long as no inconsistency arises. With regard to the other configurations as well, the embodiments disclosed herein are in all respects as illustrative, and appropriate changes and modifications may be made thereto without departing from the scope and sprit of the present disclosure.

Outline of the Embodiments

An article transport facility according to the present embodiment is an article transport facility that transports an article, including:

a traveling portion configured to travel on a traveling rail provided along a transport path;

a cleaning unit coupled to the traveling portion and configured to perform a cleaning operation on a cleaning target location including the traveling rail;

a feeding portion provided separately on a side of the traveling rail and a side of the traveling portion, and configured to supply traveling driving power to the traveling portion and cleaning driving power to the cleaning unit;

a power storage device electrically connected between the feeding portion and the cleaning unit, and capable of being charged and discharged; and a power control portion configured to: charge the power storage device with power corresponding to a driving state of the traveling portion and a position of the traveling portion along the transport path; and discharge the power storage device to supply power to the cleaning unit when power received from the feeding portion is insufficient relative to a total power of the traveling driving power and the cleaning driving power.

With this configuration, it is possible to automatically perform a cleaning operation on the cleaning target location including the traveling rail, while driving the traveling portion and the cleaning unit with the power supplied from the feeding portion, and moving the cleaning unit along the transport path. Since the driving power for the cleaning unit is mainly supplied from the feeding portion, it is possible to perform the cleaning operation without any constraint on the possible duration, unlike in a case where the driving power is supplied only from the power storage device.

On the other hand, there is a limit to the feeding capacity of the feeding portion. Therefore, when the power from the feeding portion is supplied to both the traveling portion and the cleaning unit, a situation may occur in which the power supplied from the feeding portion is insufficient relative to the total power of the traveling driving power to the traveling portion and the cleaning driving power to the cleaning unit. Even in such a case, the power storage device is discharged, and the power discharged from the power storage device is supplied to the cleaning unit, and it is therefore possible to continue the cleaning operation. Since the power storage device is charged with power corresponding to the driving state and the position of the traveling portion during traveling or stoppage of the traveling portion, a stored power amount greater than or equal to a certain amount can be easily secured in the power storage device. Thus, it is possible to appropriately supply the discharged power to the cleaning unit where the necessity arises.

As described thus far, it is possible to achieve an article transport facility capable of performing a cleaning operation as constantly as possible.

According to an aspect, it is preferable that the above-described article transport facility includes a traveling control portion configured to control the traveling portion, wherein the traveling control portion is configured to stop the traveling portion at a point of time when a stored power amount in the power storage device has decreased to a predetermined reference amount during traveling of the traveling portion, and the power control portion is configured to charge, in a state in which the traveling portion is stopped, the power storage device with power greater than or equal to power used when charging the power storage device in a state in which the traveling portion is traveling.

Conventionally, when the stored power amount in the power storage device runs out or runs low, the cleaning unit is brought into a non-driving state and moved to a maintenance station, and the power storage device is replaced or charged at the maintenance station. This has resulted in a problem that it is difficult for the operator in the article transport facility to differentiate between the segment for which the cleaning operation has been completed and the segment for which the cleaning operation has not been completed.

In this respect, with the above-described configuration, the traveling portion is stopped at a point of time when the stored power amount in the power storage device has decreased to a reference amount, and the power storage device is charged on that spot. Therefore, during charging, the cleaning unit will not be moved from the position at which the cleaning operation is suspended. Then, in a state in which the traveling portion is stopped, it is possible to rapidly charge the power storage device with power greater than or equal to the power supplied in a state in which the traveling portion is traveling. Once the stored power amount in the power storage device has increased, it is possible to drive the cleaning unit by using the power discharged from the power storage device, while driving the traveling portion by using the power supplied from the feeding portion, so as to resume the cleaning operation. Thus, the segment in which the traveling portion and the cleaning unit have already moved and the segment for which the cleaning operation has been completed can be matched or substantially matched. Therefore, it is possible to easily notify the operator of the segment for which the cleaning operation has been completed and the segment for which the cleaning operation has not been completed.

According to an aspect, it is preferable that the transport path is formed in a loop shape including a straight segment and a curve segment, and the power control portion is configured to charge, in a state in which the traveling portion is located in the straight segment, the power storage device with power greater than or equal to power used when charging the power storage device in a state in which the traveling portion is located in the curve segment.

In a state in which the traveling portion is located in the straight segment, the power receiving efficiency in the feeding portion is often higher than in a state in which the traveling portion is located in the curve segment. Therefore, with the above-described configuration, a relatively large amount of electric charge per unit time can be stored in the power storage device. Thus, it is possible to efficiently charge the power storage device according to the magnitude relationship of receivable power based on the shapes of the segments in the transport path.

According to an aspect, it is preferable that the power control portion is configured to:

charge, in a state in which the traveling portion is traveling in the curve segment, the power storage device with first set power that has been preset;

charge, in a state in which the traveling portion is stopped in the curve segment or a state in which the traveling portion is traveling in the straight segment, the power storage device with second set power that has been preset to a value greater than the first set power; and charge, in a state in which the traveling portion is stopped in the straight segment, the power storage device with third set power that has been preset to a value greater than the second set power.

With this configuration, the power storage device is charged with any of the set powers that have been set in three staged for combinations (four different combinations) of the driving state (traveling/stopped) of the traveling portion and the position (straight segment/curve segment) of the traveling portion along the transport path. It is possible to achieve a simplified control as compared with that achieved by a configuration in which the power during charging is separately set for all combinations of the driving state of the traveling portion and the position of the traveling portion along the transport path. Since the charging power in a state in which the traveling portion is located in the straight segment is set to be greater than the charging power in a state in which the traveling portion is located in the curve segment, and the charging power in the stopped state of the traveling portion is greater than the charging power in the traveling state, it is possible to efficiently charge the power storage device according to the combination of the driving state and the position of the traveling portion.

According to an aspect, it is preferable that the first set power is set to zero.

In a state in which the traveling portion is located in the curve segment, the power receiving efficiency in the feeding portion is often lower than that in a state in which the traveling portion is located in the straight segment, and a large amount of the power received from the feeding portion is often consumed for driving of the traveling portion and the cleaning unit. When the power storage device is further forcefully charged in such a case, there may be a case where the power received from the feeding portion is insufficient relative to the total power (overall consumed power) of the traveling driving power, the cleaning driving power, and the charging power.

In this respect, with the above-described configuration, in a state in which the traveling portion is traveling in the curve segment, the charging power is set to zero, and charging to the power storage device is inhibited. Thus, a situation where the overall consumed power exceeds the power received from the feeding portion can be easily avoided, making it possible to avoid the occurrence of errors such as an operation failure due to a shortage of power. Furthermore, even in a state in which charging to the power storage device is inhibited, discharging from the power storage device is allowed. Accordingly, even if the total power of the traveling driving power and the cleaning driving power exceeds the power received from the feeding portion, the cleaning operation can be continued with the power discharged from the power storage device.

According to an aspect, it is preferable that the feeding portion includes feeding lines provided on a side of the traveling rail, and a power receiving coil provided on a side of the traveling portion, the traveling rail includes a pair of rail bodies provided so as to be spaced apart in a width direction, and a pair of support members each extending inward in the width direction from the corresponding one of the pair of rail bodies so as to support the corresponding one of the feeding lines, the traveling portion or the cleaning unit includes at least a total of two detection portions each configured to operate to detect the corresponding one of the pair of feeding lines or the pair of support members as detection target objects located on opposite sides in the width direction, a length of the support member located on an inner side of a curve in the curve segment is set to be shorter than a length of said support member in the straight segment, and the power control portion is configured to: determine that the traveling portion is located in the straight segment if the detection target object has been detected by all of the detection portions; and determine that the traveling portion is located in the curve segment if the detection target object has not been detected by any of the detection portions.

With this configuration, from the relationship between the length setting of the support member in the curve segment and the placement position of the feeding line in accordance therewith, it is possible to precisely determine whether the traveling portion is located in the straight segment or the curve segment based on detection results obtained by at least two detection portions. Since the position of the traveling portion is more directly determined by using the detection portions installed in the cleaning unit or the traveling portion, it is possible to increase the accuracy of position determination as compared with, for example, a case where the position determination is performed based on traveling segment information for transport control that can be acquired by the control device of the article transport facility. Thus, it is possible to further increase the charging efficiency of the power storage device.

According to an aspect, it is preferable that the cleaning unit is provided with a display portion configured to display a voltage of each of the feeding portion and the power storage device, or a stored power amount in the power storage device.

With this configuration, it is possible to easily notify the operator in the article transport facility, for example, that the stored power amount in the power storage device is decreasing during the cleaning operation, or that the stored power amount is being restored during charging of the power storage device.

The invention claimed is:

1. An article transport facility that transports an article, comprising:
   a traveling portion configured to travel on a traveling rail provided along a transport path;
   a cleaning unit coupled to the traveling portion and configured to perform a cleaning operation on a cleaning target location including the traveling rail;
   a feeding portion provided separately on a side of the traveling rail and a side of the traveling portion, and configured to supply traveling driving power to the traveling portion and cleaning driving power to the cleaning unit;
   a power storage device electrically connected between the feeding portion and the cleaning unit, and capable of being charged and discharged; and a power control portion configured to: charge the power storage device with power corresponding to a driving state of the traveling portion and a position of the traveling portion along the transport path; and discharge the power storage device to supply power to the cleaning unit when power received from the feeding portion is insufficient relative to a total power of the traveling driving power and the cleaning driving power.

2. The article transport facility according to claim 1, comprising
a traveling control portion configured to control the traveling portion,
wherein the traveling control portion is configured to stop the traveling portion at a point of time when a stored power amount in the power storage device has decreased to a predetermined reference amount during traveling of the traveling portion, and
wherein the power control portion is configured to charge, in a state in which the traveling portion is stopped, the power storage device with power greater than or equal to power used when charging the power storage device in a state in which the traveling portion is traveling.

3. The article transport facility according to claim 1,
wherein the transport path is formed in a loop shape including a straight segment and a curve segment, and
wherein the power control portion is configured to charge, in a state in which the traveling portion is located in the straight segment, the power storage device with power greater than or equal to power used when charging the power storage device in a state in which the traveling portion is located in the curve segment.

4. The article transport facility according to claim 3,
wherein the power control portion is configured to:
charge, in a state in which the traveling portion is traveling in the curve segment, the power storage device with first set power that has been preset;
charge, in a state in which the traveling portion is stopped in the curve segment or a state in which the traveling portion is traveling in the straight segment, the power storage device with second set power that has been preset to a value greater than the first set power; and
charge, in a state in which the traveling portion is stopped in the straight segment, the power storage device with third set power that has been preset to a value greater than the second set power.

5. The article transport facility according to claim 4, wherein the first set power is set to zero.

6. The article transport facility according to claim 3, wherein the feeding portion includes feeding lines provided on a side of the traveling rail, and a power receiving coil provided on a side of the traveling portion,
wherein the traveling rail includes a pair of rail bodies provided so as to be spaced apart in a width direction, and a pair of support members each extending inward in the width direction from the corresponding one of the pair of rail bodies so as to support the corresponding one of the feeding lines,
wherein the traveling portion or the cleaning unit includes at least a total of two detection portions each configured to operate to detect the corresponding one of the pair of feeding lines or the pair of support members as detection target objects located on opposite sides in the width direction,
wherein a length of the support member located on an inner side of a curve in the curve segment is set to be shorter than a length of said support member in the straight segment, and
wherein the power control portion is configured to: determine that the traveling portion is located in the straight segment if the detection target object has been detected by all of the detection portions; and determine that the traveling portion is located in the curve segment if the detection target object has not been detected by any of the detection portions.

7. The article transport facility according to claim 1, wherein the cleaning unit is provided with a display portion configured to display a voltage of each of the feeding portion and the power storage device, or a stored power amount in the power storage device.

* * * * *